United States Patent Office 3,380,994
Patented Apr. 30, 1968

3,380,994
COUMERMYCIN DERIVATIVES
Donald Edward Nettleton, Jr., Jordan, N.Y., assignor to Bristol-Myers Company, New York, N.Y., a corporation of Delaware
No Drawing. Filed Oct. 3, 1966, Ser. No. 583,992
10 Claims. (Cl. 260—210)

ABSTRACT OF THE DISCLOSURE

The di-, tri-, and tetra-tetrahydropyranylethers of coumermycin $A_1$ and $A_2$ are extremely valuable intermediates in the preparation of novel derivatives of coumermycin.

BACKGROUND OF THE INVENTION (1) Field of the invention: The di-, tri- and tetrahydropyranyl ethers of the present invention are heretofore unknown compounds that are valuable as intermediates in the preparation of novel coumermycin derivatives.

(2) Description of the prior art: The compounds of the present invention are novel derivatives of the known antibiotic agents coumermycin $A_1$ and $A_2$ of U.S. Patent 3,201,386.

SUMMARY OF THE INVENTION

Compounds having the formula

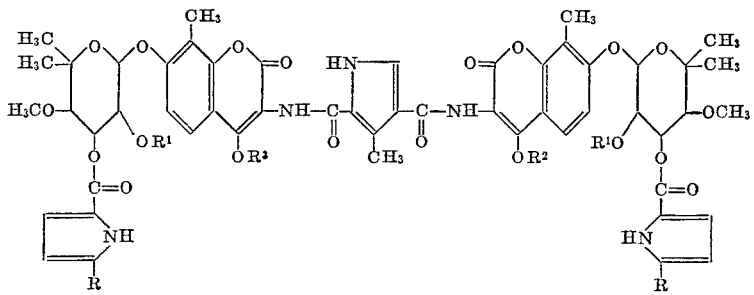

wherein
R is hydrogen or methyl,
$R^1$ is 2-tetrahydropyranyl

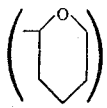

$R^2$ and $R^3$ are alike or different but are hydrogen or 2-tetrahydropyranyl,
are prepared by mixing together substantially pure coumermycin $A_1$ or $A_2$ with excess dihydropyran in the presence of an acid catalyst and an inert solvent to yield mixtures of mono-, di,- tri- and tetra-tetrahydropyranyl-ether derivatives of coumermycin $A_1$ or $A_2$ respectively.

DETAILED DESCRIPTION

This invention relates to new and useful derivatives of the antibiotic substances coumermycin $A_1$ and coumermycin $A_2$ (U.S. Patent 3,201,386) and to processes for their production. More particularly, it relates to the di-, tri- and tetra-tetrahydropyranyl ethers of coumermycin $A_1$ and $A_2$ and to the process of preparing same by reaction of the purified parent compound with dihydropyran in the presence of an acid catalyst.

Coumermycin $A_1$ (R is methyl) and coumermycin $A_2$ (R is H)

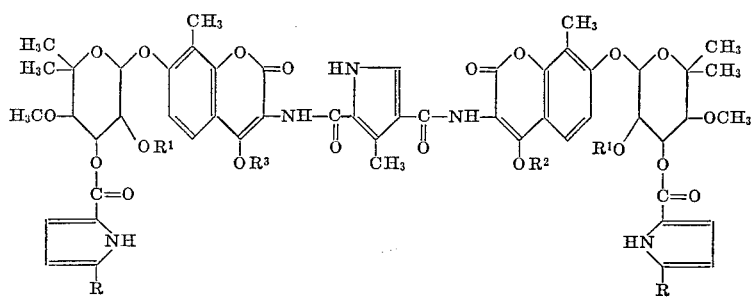

are effective in inhibiting the growth of Gram-positive bacteria. Both are nontoxic and exhibit a therapeutic effect on mice infected with Gram-positive bacteria. A major disadvantage of the coumermycins however is their poor absorption and resultant low blood levels. Efforts to correct these deficiencies through the chemical modification of the parent molecules have resulted in the new and useful tetrahydropyranyl ethers of these compounds as chemical intermediates in the ultimate synthesis of new and useful antibiotic substances.

The invention claimed herein is a process for the preparation of compounds of the formula

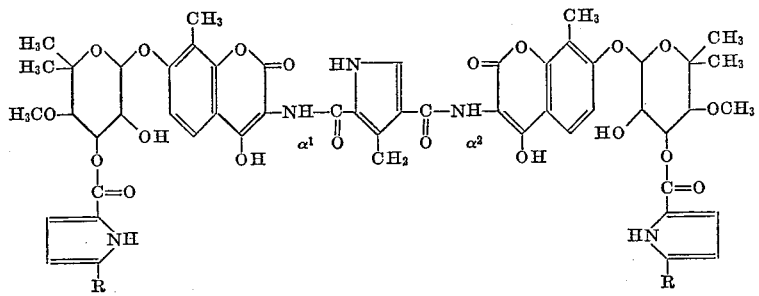

wherein
R is hydrogen or methyl, $R^1$ is 2-tetrahydropyranyl

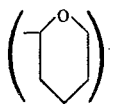

$R^2$ and $R^3$ are alike or different but are hydrogen or 2-tetrahydropyranyl

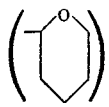

The process is usually performed by mixing together substantially pure coumermycin $A_1$ or coumermycin $A_2$ with excess dihydropyran in the presence of an acid catalyst and an inert solvent to yield mixtures of mono-, di-, tri- and tetra-tetrahydropyranyl ether derivatives of coumermycin $A_1$ or $A_2$ respectively.

More specifically, a coumermycin is mixed together with dihydropyran in various molar proportions, but preferably in a ratio of one mole of coumermycin to more than 20 moles of dihydropyran.

The addition of a suitable acid to the coumermycin-dihydropyran mixture as a catalyst is essential. The acid employed is usually selected from one of the following groups.

(1) Concentrated mineral acids such as sulfuric acid, phosphoric acid, phosphorous acid, and hydrochloric acid.

(2) Arylsulfonic acids having the following formula

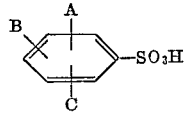

in which each of A, B and C are alike or different and are hydrogen, halogen, (lower) alkyl, (lower) alkoxy, nitro, aryl, or cyano.

(3) Lewis acids such as $SnCl_4$, $AlCl_3$, $BF_3$, $ZnCl_2$, $FeCl_3$.

(4) Acid resins in their acidic form ($H^+$) such as the phenolic sulfonic acids, polystyrene sulfonic acids, polystyrene phosphorous acids, polystyrene phosphonic acids, acrylic carboxylic acids, polystyrene nuclear sulfonic acids, methacrylic carboxylic acid, and in particular macroreticular polystyrene sulfonic acid (Amberlyst 15, Rohm & Haas).

(5) Activated carboxylic acids such as $F_3C-CO_2H$, $F_2CHCO_2H$,

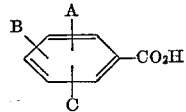

wherein A, B and C are alike or different but are nitro, fluoro, cyano or hydrogen.

(6) Alkylsulfonic acids having the formula $$R-(CH_2)_xSO_3H$$

wherein R is selected from the group consisting of aryl, substituted aryl, (lower)alkyl, substituted (lower)alkyl; and where x is a whole integer of 0 to 6 inclusive.

The quantity of the acid employed as the catalyst is usually determined by the reaction conditions, the bulk of the catalyst and the amount at which the optimum yield of product is obtained.

The reaction may be conducted with or without the use of a co-solvent, the co-solvent usually being employed to increase the solubility of the reactants and reduce the viscosity of the mixture. The co-solvent used is inert and is usually selected from the group consisting of tetrahydrofuran, dioxane, diethyl ether, the dipropyl ethers, the dibutyl ethers, benzene, xylene and toluene.

The reaction is exothermic. Its temperature can be carefully controlled or it can be allowed to seek its own level without substantial differences in the end result. The process is usually conducted at a temperature of 0°–100° C., but preferably in the temperature range of 25° to 60° C. for a period of time dependent upon the temperature used and ultimately upon the completion of reaction and the yields obtained.

As mentioned previously, the process usually results in the formation of mixtures of mono-, di-, tri- and tetra-substituted tetrahydropyranyl ether derivatives of the coumermycins. The ratio of the components of the mixture however, is largely dependent upon the reaction conditions, and most particularly the method of work-up and purification of same.

When the reaction is conducted at elevated temperatures of 60–80° C. for 2 to 4 hours, or at lower temperatures for longer periods of time, under very anhydrous conditions, followed by purification in the absence of polar solvents, there is obtained a product consisting of 80 to 99% pure 2′,2′,4,4-O,O,O,O-tetratetrahydropyranylcoumermycin. The other possible tetrahydropyranylcoumermycins are usually found in the following order of their relative concentration: 2′,2′,4-O,O,O,-tritetrahydropyranyl>2′,2′ - O,O - ditetrahydropyranyl>2′ - O-monotetrahydropyranyl>coumermycin.

When the reaction is conducted at lower temperatures, or for shorter periods of time, or under conditions not as anhydrous, the proportion of the 2′,2′,4,4-O,O,O,O-tetratetrahydropyranylcoumermycin in the mixture decreases as the proportion of the other tetrahydropyranyl ethers increases.

It is a fact that the tetrahydropyranyl moiety attached to either or both 4-O-positions of the coumermycin molecule is quite labile in the presence of polar solvents. When 2',2',4,4-O,O,O,O-tetratetrahydropyranylcoumermycin or 2',2',4-O,O,O-tritetrahydropyranylcoumermycin is crystallized or recrystallized from a hot alcohol solvent system, the 4-O-tetrahydropyranyl ether functions are cleaved to 4-hydroxyl functions to yield pure 2',2'-O,O-ditetrahydropyranylcoumermycin. The 2'-O-tetrahydropyranyl ether functions are generally stable when crystallization is carried out in the absence of acidic materials.

Resolution of mixtures of the tetrahydropyranyl ether derivatives can be accomplished by counter-current distribution purification. As a practical matter, the material is suitable as a mixture of di-, tri- and tetra-tetrahydropyranylcoumermycin, or it can be crystallized from a hot alcoholic solvent system to yield pure 2',2-O,O-ditetrahydropyranylcoumermycin, for use as an intermediate in its ultimate conversion to a biologically active agent.

2',2'-O,O - ditetrahydropyranylcoumermycin, 2',2',4-O,O,O - tritetrahydropyranylcoumermycin, and 2',2',4,4-O,O,O,O-tetratetrahydropyranylcoumermycin, as pure entities or mixtures thereof, are valuable as intermediates in the preparation of extremely pure coumermycin $A_1$ or $A_2$. The mixing of either of the above compounds or mixtures thereof in an alcoholic solvent in the presence of a catalytic amount of acid (selected from those described above) results in the cleavage of *all* tetrahydropyranyl linkages in the molecule. Subsequent isolation of the product yields purified coumermycin $A_1$ or $A_2$ depending upon the starting material.

2',2' - O,O - ditetrahydropyranylcoumermycin, 2',2',4-O,O,O - tritetrahydropyranylcoumermycin or 2',2',4,4-O,O,O,O - tetratetrahydropyranylcoumermycin, as pure entities or mixtures thereof, are also valuable as intermediates in the production of new and biologically active compounds. The treatment of one of the above, or a mixture of two or all three with an acylating agent will cleave the coumermycin molecule at either one or both α-amide linkages between the coumarin and pyrroledicarboxylic acid moieties to form compounds of the formulas

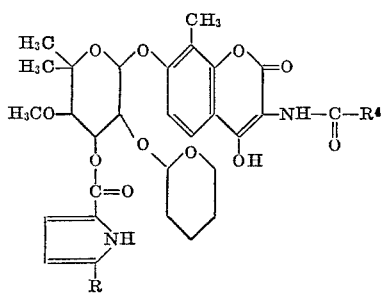

plus

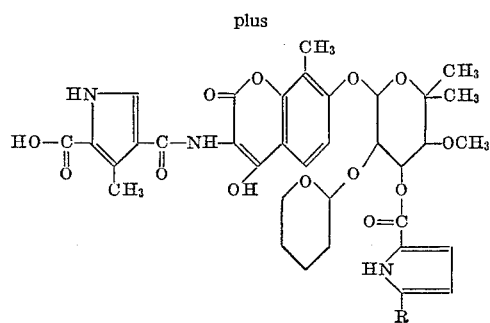

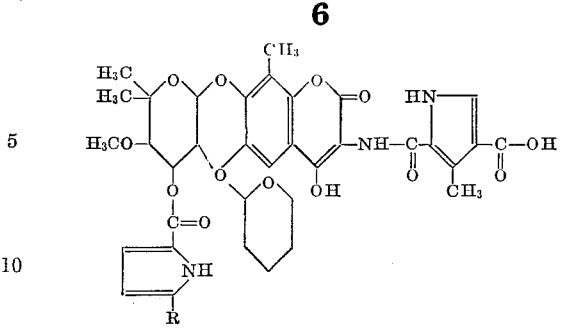

and/or wherein R is either hydrogen or methyl, and $R^4$ is (lower)alkyl or aryl.

More specifically, an acylative cleavage of the di-, tri- or tetra-tetrahydropyranyl ethers of coumermycin $A_1$, or mixtures thereof, is performed by mixing the above with quantities of benzoyl chloride, benzoyl bromide or benzoic acid anhydride in pyridine. Heating the mixture at temperatures below the boiling point for several hours or keeping it at room temperature for several days results in the production of material having the formula

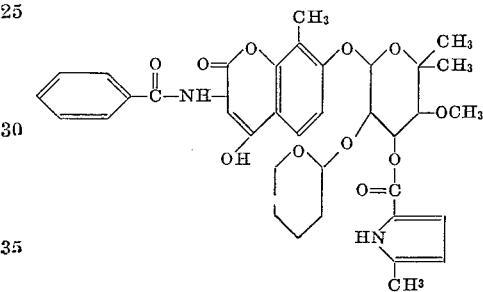

Under the reaction conditions employed, any tetrahydropyranyl moieties attached to the 4-O-position are cleaved to hydroxyl. Further treatment of the product by mixing in an alcoholic solvent in the presence of a catalytic amount of an acid (selected from those described above) results in the cleavage of the 2'-O-tetrahydropyranyl ether linkage to yield N-benzoyl-3-amino-4-hydroxy-8-methyl - 7 - [3-O-(5-methyl-2-pyrrolylcarbonyl)noviosyloxy]coumarin

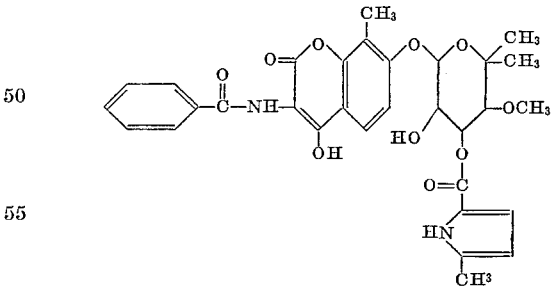

which exhibits antibiotic activity in mammals against *Staphylococcus aureus*.

The standard coumermycin $A_1$ assay is run on Petri plates prepared by using ten ml. of Baltimore Biological Laboratories (BBL) base agar and a top layer of four ml. of BBL seed agar inoculated with *Staph. aureus* ATCC 6538P. The plates are incubated for 18 hours at 30° C. A standard activity curve for coumermycin $A_1$ is determined by using concentrations in the range of 0.07 to 1.5 µg./ml.

In the instant invention, use of the word coumermycin without specifically stating coumermycin $A_1$ or $A_2$, shall be taken to mean either coumermycin $A_1$ or $A_2$ or their derivatives, said compounds being chemically equivalent in this process.

The objectives of the present invention have been achieved, by the provision according to the present invention, of the process for the production of compounds having the formula

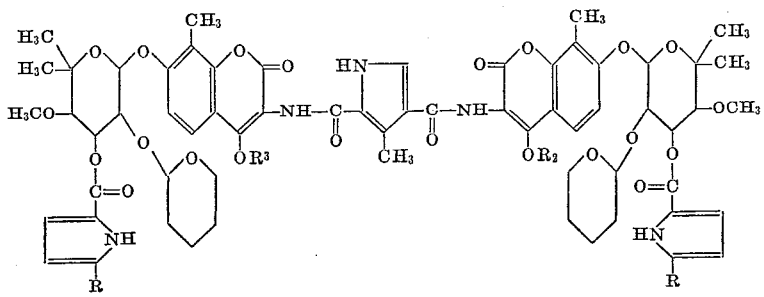

wherein $R^2$ and $R^3$ are alike or different but are either hydrogen or

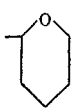

and

R is either hydrogen or methyl;

which comprises *mixing* together a compound having the formula

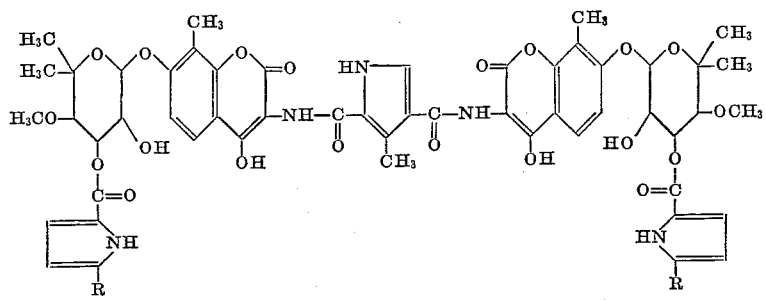

with excess dihydropyran, but preferably in a ratio of one mole of coumermycin $A_1$ or $A_2$ to more than 20 moles of dihydropyran, and a strong acid catalyst selected from the group consisting of mineral acids, arylsulfonic acids, Lewis acids, acid resins, activated carboxylic acids and alkylsulfonic acids, but preferably with arylsulfonic acids or strong acid resins, with or without the presence of an inert solvent, but preferably with the presence of a solvent selected from the group consisting of tetrahydrofuran, dioxane, diethyl ether, the dipropyl ethers, the dibutyl ethers, benzene, xylene and toulene, at a temperature in the range of 0°–100° C., but preferably at a temperature in the range of 10°–50° C., and most preferably at about room temperature, for a period of time usually determined by the temperature at which the process is conducted, i.e., the lower the temperature the longer the time, but usually for a period of time of 15 minutes to 200 hours.

In the preferred embodiments of the present invention, R is as defined above and is especially methyl, $R^2$ and $R^3$ are hydrogen.

EXAMPLE 1

2′,2′-O,O-ditetrahydropyranylcoumermycin $A_1$

Finely ground coumermycin $A_1$, 5.5 g. (the free acid, purified by recrystallization as the sodium salt), was slurried in 50 ml. DHP (dihydropyran) and a trace of p-toluenesulfonic acid (2–3 mg.) was added. The mixture was stirred magnetically in a stoppered flask under anhydrous conditions at 25° C. for 3½ hours, dissolution of the solid being complete in this case after 2 hours.

The solution was evaporated to dryness in vacuo at minimum temperature (below 40° C.) and the residue remaining dissolved in boiling acetone (30 ml.). Hot ethanol was slowly added with stirring and heating until 100 ml. had been added. The product crystallized upon cooling overnight to yield 5.3 g. (84%) of fine cubic crystals. An additional 810 mg. (13%) separated as a second crop from the mother liquor after standing at —5° C. for 24 hours.

A sample (1.7 g.) was recrystallized twice from acetone-ethanol to give a pure sample (1.5 g.), M.P. decomposition 200° C.

*Analysis.*—Calcd. for $C_{65}H_{75}O_{22}N_5$: C, 61.06; H, 5.91; N, 5.47. Found: C, 61.00; H, 5.83; N, 5.56. Neutral equivalent: found, 623; calcd. 634.

EXAMPLE 2

2′,2′-O,O-ditetrahydropyranylcoumermycin $A_1$

Coumermycin $A_1$ (5.5 g.) was stirred with 50 ml. THF (tetrahydrofuran) at room temperature until dissolution was complete. DHP (25 ml.) was added followed by the catalyst, Amberlyst 15 (H+) resin (containing less than 0.5% $H_2O$). As stirring was continued an additional 25 ml. of DHP was added. Some coumermycin separated as gel.

The exothermic reaction was maintained at 30–35° C. by the use of an icewater bath and after 1 to 2 hours the gel gradually returned to solution. When solution was attained, the exothermic reaction subsided. Stirring was continued another 2 to 3 hours (total reaction time about 4 hours) during which time the solution darkened to an orange-brown color.

The Amberlyst resin was removed by filtration and the solution concentrated in vacuo to a syrup. Dilution of the syrup with methanol (500 ml.) resulted in the formation of a crystalline solid which was washed with a little methanol, then dried, to yield 6.06 g. (93%) of product.

The crude product was dissolved in a mixture of methanol (20 ml.) and methylene chloride (20 ml.), this dissolution being somewhat difficult. The solution was warmed to a boil and methanol added to the cloud point (about 30 ml. required). As the mix cooled, methylene chloride was added in quantities just sufficient to maintain a clear solution at room temperature (22.5° C.). Upon standing the product slowly crystallized in fine needles. Yield: 3.96 g. (62%). Another 1.26 g. (20%)

was obtained from the mother liquor by dilution with methanol.

The reaction temperature may be permitted to rise without cooling, with no ill effect; in fact in larger scale reactions the heat of reaction may be advantageous. On large scale runs the reaction mixture was stirred for 24 hours, during which time the reaction mixture returned to ambient temperature (usually in the first 6 hours). In most cases, the material after the first methanol precipitation was used for further work. If this material has more than 2 $\mu$g./mg. activity by coumermycin $A_1$ assay, or if significant amounts of coumermycin ($Rf \sim 0.3$) and/or its monotetrahydropyranyl derivatives ($Rf=0.45-0.50$) are found present, it is recycled through the process. The $Rf$ values are obtained using thin layer chromatography plates prepared from silica gel in a solvent system consisting of 9:21:8 (parts by volume) of methyl acetate:2-propanol:concentrated $NH_4OH$.

EXAMPLE 3

Di-, tri-, and tetra-tetrahydropyranylcoumermycin $A_1$ mixture and its resolution Coumermycin $A_1$ was stirred with THF at room temperature until dissolution occurred. DHP was added followed by Amberlyst 15 ($H^+$) resin (containing less than 0.5% $H_2O$). As stirring continued, additional DHP was added. A gel formed that re-dissolved after one to two hours. Stirring was continued overnight at room temperature during which time the solution was darkened to an orange-brown color.

The Amberlyst resin was removed by filtration and the solution concentrated in vacuo to a syrup. Dilution of the syrup with a minimal quantity of methanol yielded a crude solid (85-95% of theory). The solid was dried in vacuo. Thin layer chromatography indicated the solid consisted of at least three zones ($Rf$ 0.6-0.7).

A Craig counter-current distribution separation was run on a 15 g. sample of the mixture using $\frac{1}{2}$ volume upper phase to 1 volume lower phase from a system of 5:1:5.1 of $CCl_4$:$CHCl_3$:$CH_3OH$:$H_2O$ over 1001 transfers, 97.5% of the solid being recovered in total. The recoveries from the major concentrations as determined by ultra violet absorption at 345 m$\mu$ were as follows:

2',2',4,4-O,O,O,O-tetratetrahydropyranyl-coumermycin $A_1$

The tetra-substituted tetrahydropyranyl ether of coumermycin $A_1$ was recovered from tubes 21 through 40 as a pure crystalline solid, 3.68 g., M.P. decomposition above 200° C.

*Analysis.*—Calcd. for $C_{75}H_{91}N_5O_{24}$: C, 62.27; H, 6.34; N, 4.84. Found: C, 62.03; H, 6.31; N, 4.94.

2',2',4-O,O,O-tritetrahydropyranylcoumermycin $A_1$

The tri-substituted tetrahydropyranyl ether of coumermycin $A_1$ was recovered from tubes 41–70 as a pure crystalline solid, 3.8 g., M.P. decomposition above 200° C.

*Analysis.*—Calcd. for $C_{70}H_{83}N_5O_{23}$: C, 61.71; H, 6.14; N, 5.14. Found: C, 61.65; H, 6.19; N, 5.34.

2',2'-O,O-ditetrahydropyranylcoumermycin $A_1$

The di-substituted tetrahydropyranyl ether of coumermycin $A_1$ was recovered from tubes 71–100 as a pure crystalline solid, 1.8 g., M.P. decomposition above 200° C. The product was identical in its physical characteristics to previously characterized material.

2'-O-monotetrahydropyranylcoumermycin $A_1$

The mono-substituted tetrahydropyranyl ether of coumermycin $A_1$ was recovered from tubes 101–130 as a pure crystalline solid, 1.6 g., M.P. decomposition above 200° C.

*Analysis.*—Calcd. for $C_{60}H_{65}N_5O_{21}$: C, 60.35; H, 5.66; N, 5.86. Found: C, 60.42; H, 5.81; N, 5.83.

Coumermycin $A_1$ was recovered unreacted from tubes 300–499, 1.5 g., M.P. decomposition 240–245° C., said product being identical in its physical characteristics to previously characterized material.

EXAMPLE 4

2',2'-O,O-ditetrahydropyranylcoumermycin $A_1$

Coumermycin $A_1$ is stirred with THF at room temperature until solution is attained. DHP and several drops of concentrated $H_2SO_4$, HCl, or $H_3PO_4$ are added and the stirring is continued for approximately four hours. Five grams of finely powdered $Na_2CO_3$ are added to destroy the acid. Decantation followed by removal of the solvent in vacuo gives a syrup, which upon dilution with methanol crystallizes to a solid. Recrystallization of the solid from methanol, a methanol-halogenated hydrocarbon mixture or methanol-acetone mixture yields pure product, M.P. decomposition above 200° C., identical with previously characterized material.

EXAMPLE 5

2',2'-O,O-ditetrahydropyranylcoumermycin $A_1$

Coumermycin $A_1$ (1110.06 g., 1.0 mole) was slurried in a mixture of 11.2 liters of dry THF and 11.2 liters of dry DHP. p-Toluenesulfonic acid monohydrate (22.2 g.) was added and the solution was stirred for twenty hours at room temperature. The solution was concentrated to $\frac{1}{3}$ of the volume in vacuo at less than 40° C., filtered and the filtrate poured into 134 liters of dry methanol at 0° C. The product crystallized upon stirring for 30 minutes at 0–5° C. and was collected by filtration. The filter cake was covered by dry solvent at all times while washing same with 10 liters of dry, cold methanol, followed by 5 liters of petroleum ether.

Recrystallization from hot methanol yielded the desired 2',2'-O,O-ditetrahydropyranyl ether.

EXAMPLE 6

2',2'-O,O-ditetrahydropyranylcoumermycin $A_2$

Substitution in the procedure of Examples 1, 2, 3, 4, or 5 for the coumermycin $A_1$ used therein of coumermycin $A_2$ produces 2',2'-O,O-ditetrahydropyranylcoumermycin $A_2$.

EXAMPLE 7

2',2',4,4-O,O,O,O-tetratetrahydropyranylcoumermycin $A_2$

Substitution in the procedure of Example 3 for the coumermycin $A_1$ used therein of coumermycin $A_2$ produces 2',2',4,4 - O,O,O,O - tetratetrahydropyranylcoumermycin $A_2$.

EXAMPLE 8

2',2',4-O,O,O-tritetrahydropyranylcoumermycin $A_2$

Substitution in the procedure of Example 3 for the coumermycin $A_1$ used therein of coumermycin $A_2$ produces 2',2',4-O,O,O-tritetrahydropyranylcoumermycin $A_2$.

EXAMPLE 9

2'-O-monotetrahydropyranylcoumermycin $A_2$

Substitution in the procedure of Example 3 for the coumermycin $A_1$ used therein of coumermycin $A_2$ produces 2'-O-monotetrahydropyranylcoumermycin $A_2$.

EXAMPLE 10

Coumermycin $A_1$ via its tetrahydropyranyl ethers

2',2'-O,O-ditetrahydropyranylcoumermycin $A_1$, 2',2',4-O,O,O-tritetrahydropyranylcoumermycin $A_1$, 2',2',4,4-O,O,O,O-tetratetrahydropyranylcoumermycin $A_1$ or mixtures thereof are readily cleaved to a purified coumermycin $A_1$ by dissolving the ethers in an alcohol or alcohol-acetone solvent along with a catalytic amount of p-toluenesulfonic acid, followed by stirring for several hours. The purified coumermycin $A_1$ obtained by the procedure is usually of superior quality and compares favorably to that prepared by other purification methods.

EXAMPLE 11

2′,2′-O,O-ditetrahydropyranylcoumermycin A₁ via 2′,2′,4,4-O,O,O,O-tetratetrahydropyranylcoumermycin A₁

Pure 2′,2′,4,4 - O,O,O,O - tetratetrahydropyranylcoumermycin A₁, obtained from Example 3, is dissolved in hot methanol, the solution concentrated in vacuo and the solid allowed to crystallize on cooling to yield pure 2′,2′-O,O-ditetrahydropyranylcoumermycin A₁, M.P. decomposition above 200° C., identical with material previously characterized.

EXAMPLE 12

2′,2′-O,O-ditetrahydropyranylcoumermycin A₁ via 2′,2′,4-O,O,O-tritetrahydropyranylcoumermycin A₁

Pure 2′,2′,4-O,O,O - tritetrahydropyranylcoumermycin A₁, obtained from Example 3, is dissolved in hot methanol, the solution concentrated in vacuo and the solid allowed to crystallize on cooling to yield pure 2′,2′-O,O-ditetrahydropyranylcoumermycin A₁, M.P. decomposition above 200° C., identical with material previously characterized.

EXAMPLE 13

N-benzoyl-3-amino-4-hydroxy-8-methyl-7-[3-O-(5-methyl-2-pyrrolycarbonyl)noviosyloxy]coumarin Sixteen grams of a mixture of di-, tri- and tetra-tetrahydropyranylcoumermycin A₁ was dissolved in 35 ml. of freshly distilled pyridine. Benzoyl chloride (6.6 ml.) was added directly and carefully to the stirred solution at 25° C. over a ten minute period and then stirred at room temperature a total of 124 hours. The deep orange solution was concentrated in vacuo to approximately 50 ml. and poured into 2000 ml. of vigorously stirred ice water. The pH was adjusted to 5.0 with 6 N hydrochloric acid (500 ml.), then stirred at 0–5° C. for one hour. The pink amorphous solids were vacuum filtered, washed with water and vacuum dried to yield 19.6 g. of solid, *Staphylococcus aureus* plate assay equivalent to 0.51 μg/mg. (compared to standard coumermycin A₁).

Treatment of the solid using the tetrahydropyranyl ether cleavage reaction described in Example 9 yielded 19 g. of a red crystalline residue, *Staphylococcus aureus* plate assay equivalent to 8.5 μg/mg. Fractional crystallization from ethyl acetate-"Skellysolve B" (petroleum hydrocarbon, B.P. 60–68° C., essentially n-hexane) yielded 5.6 g. of light yellow crystalline product, M.P.: tans and softens 190° C., decomposes vigorously at 230–235° C., *Staph. aureus* plate assay equivalent to 54 μg/mg.

*Analysis.*—Calcd. for $C_{31}H_{32}O_{10}N_2$: C, 62.83; H, 5.45; N, 4.73. Found: C, 63.49; H, 5.78; N, 4.43.

Initial studies performed on laboratory animals indicate that oral or intramuscular administration results in blood levels determined to be of therapeutic efficacy.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. A compound of the formula

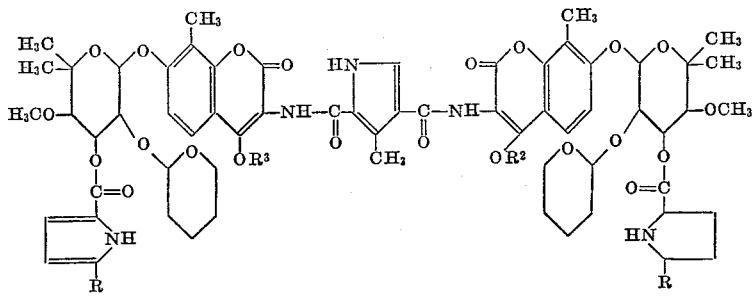

wherein
R² and R³ are the same or different but are each hydrogen or

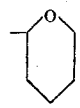

and
R is either hydrogen or methyl.

2. A compound of claim 1 having the formula

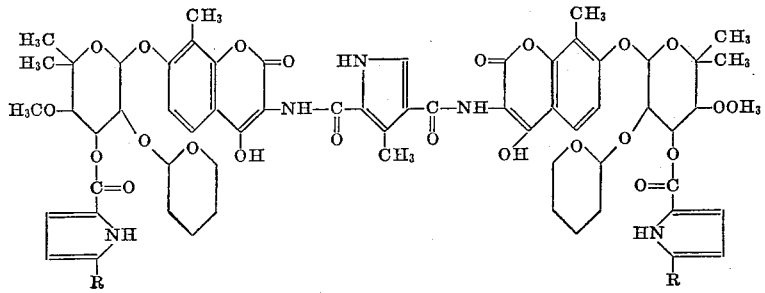

wherein R is either hydrogen or methyl.
3. A compound of claim 1 having the formula
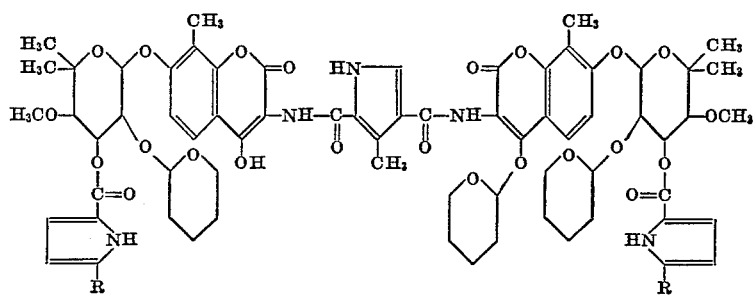
wherein R is either hydrogen or methyl.
4. A compound of claim 1 having the formula
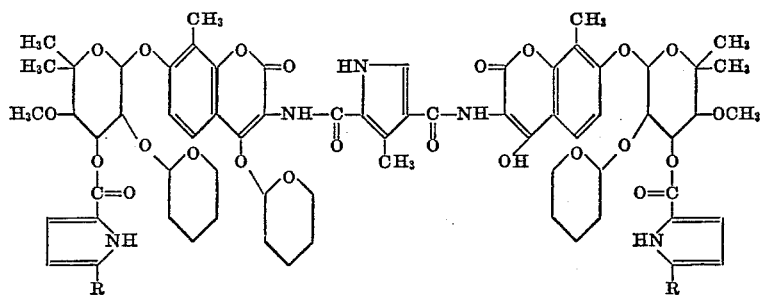
wherein R is either hydrogen or methyl.
5. A compound of claim 1 having the formula
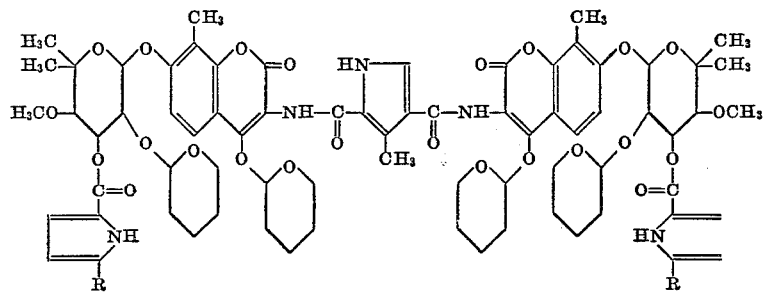
wherein R is either hydrogen or methyl.
6. The process for the production of compounds of the formula
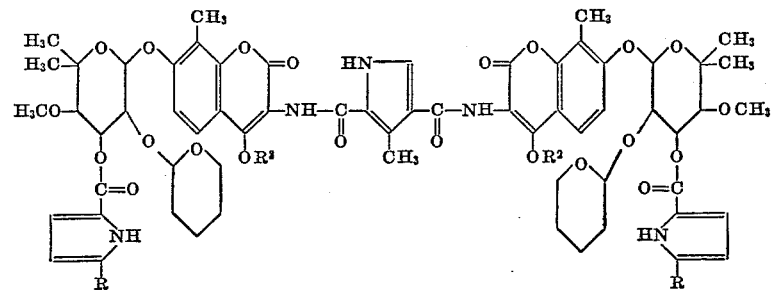

wherein

R² and R³ are alike or different but are hydrogen or

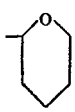

R is either hydrogen or methyl;

with excess dihydropyran and a catalytic amount of an acid selected from the group consisting of mineral acids, arylsulfonic acids, Lewis acids, strong acid resins, activated carboxylic acids and alkylsulfonic acids, in an inert solvent.

8. The process of claim 6 for the production of compounds of the formula

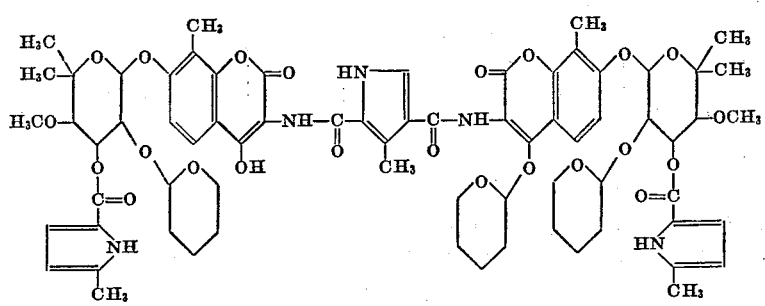

which comprises mixing together a compound having the formula

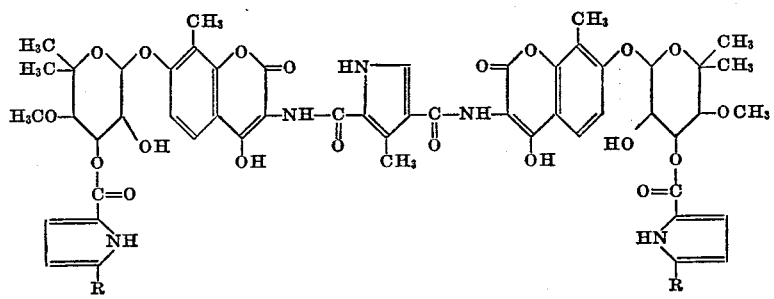

wherein R is either hydrogen or methyl; with excess dihydropyran and a catalytic amount of a strong acid.

7. The process of claim 6 for the production of compounds of the formula

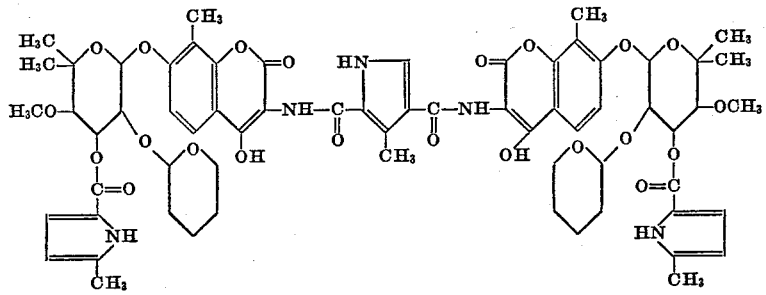

which comprises mixing together a compound having the formula

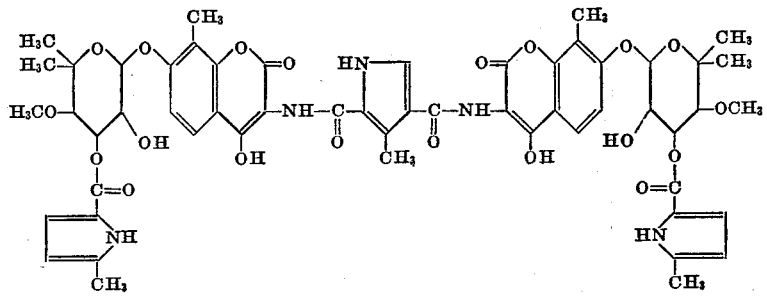

which comprises mixing together a compound having the formula

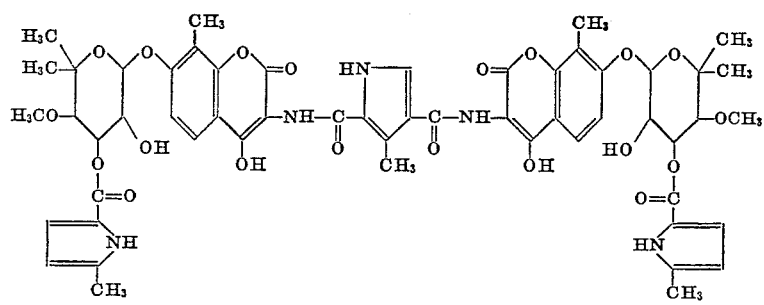

with excess dihydropyran and a catalytic amount of an acid selected from the group consisting of mineral acids, arylsulfonic acids, Lewis acids, strong acid resins, activated carboxylic acids and alkylsulfonic acids, in an inert solvent.

with excess dihydropyran and a catalytic amount of an acid selected from the group consisting of mineral acids, arylsulfonic acids, Lewis acids, strong acid resins, activated carboxylic acids and alkylsulfonic acids, in an inert solvent.

10. The process of claim 6 for the production of compounds of the formula

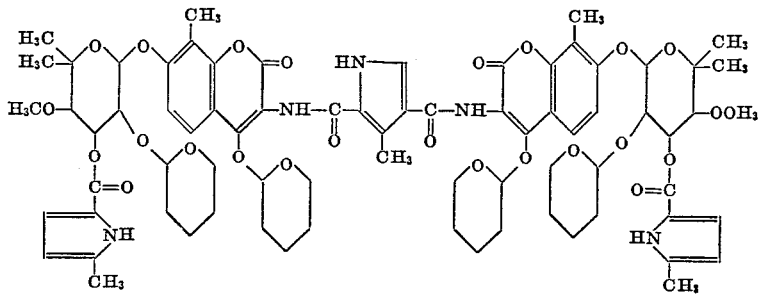

9. The process of claim 6 for the production of compounds of the formula

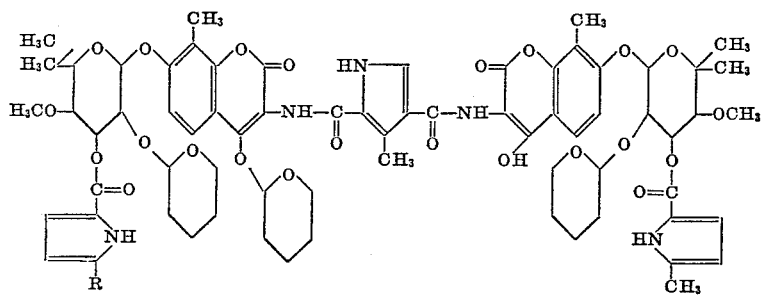

which comprises mixing together a compound having the formula

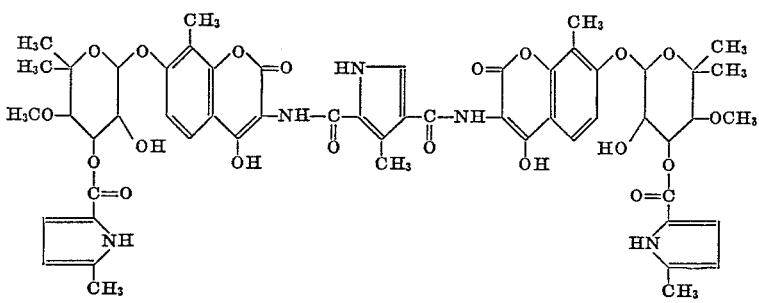

which comprises mixing together a compound having the formula

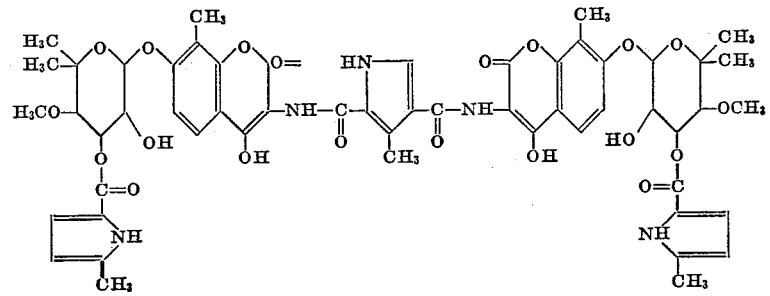

with excess dihydropyran and a catalytic amount of an acid selected from the group consisting of mineral acids, arylsulfonic acids, Lewis acids, strong acid resins, activated carboxylic acids and alkylsulfonic acids, in an inert solvent.

References Cited

Parham et al.: "Jour. American Chem. Soc.," vol. 70, 1948, pp. 4187–4189.

LEWIS GOTTS, *Primary Examiner.*

J. R. BROWN, *Assistant Examiner.*

UNITED STATES PATENT OFFICE
Certificate of Correction

Patent No. 3,380,994                              April 30, 1968

Donald Edward Nettleton, Jr.

It is certified that error appears in the above identified patent and that said Letters Patent are hereby corrected as shown below:

Columns 1 and 2, second formula should appear as shown below:

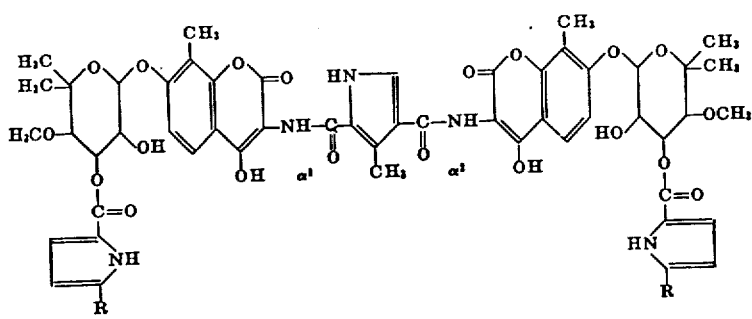

columns 3 and 4, lines 12 to 26, the formula should appear as shown below:

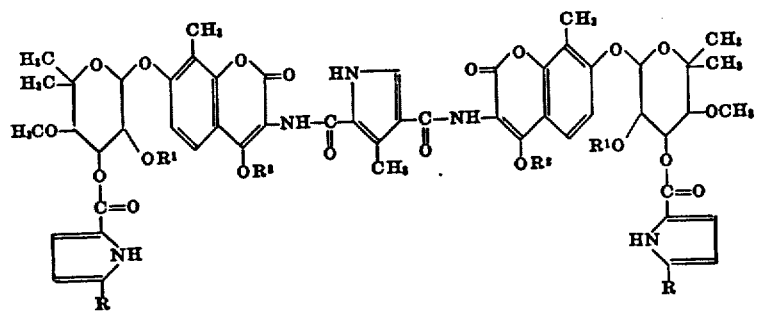

column 8, line 26, after "composition" insert —above—; column 9, line 40, "5:1:5.1" should read —5:1:5:1—; columns 11 and 12, lines 29 to 48, the formula should appear as shown below:

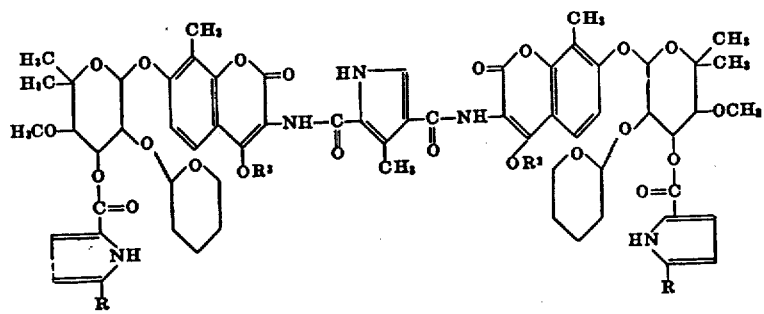

lines 61 to 75, the formula should appear as shown below:

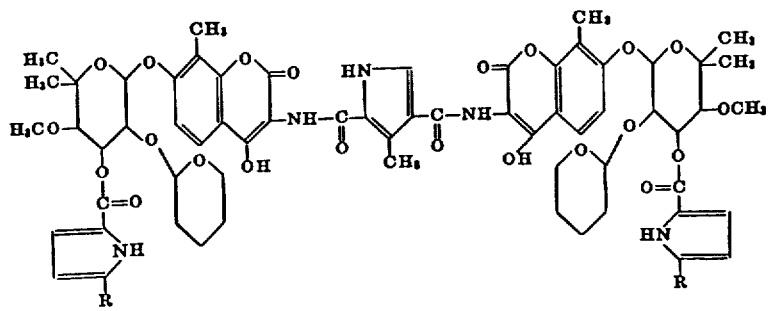

columns 13 and 14, the third formula should appear as shown below:

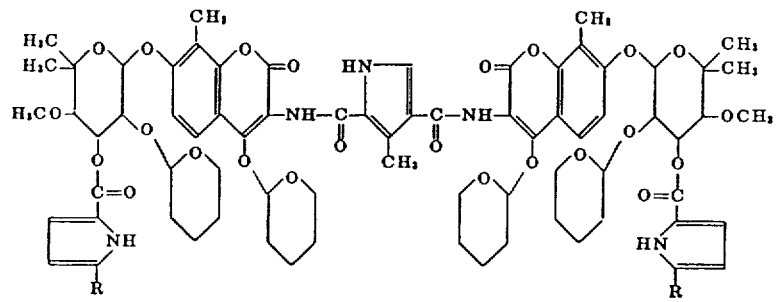

columns 17 and 18, the first formula in claim 9, should appear as shown below:

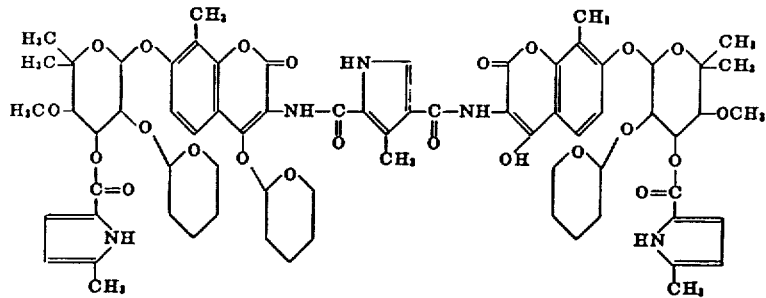

columns 17 and 18, the formula in claim 10, should appear as shown below:

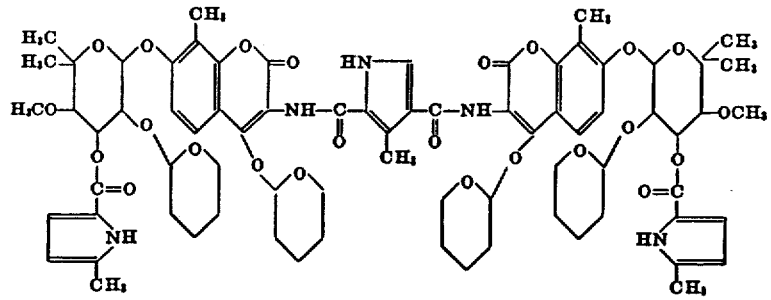

columns 19 and 20, the formula in claim 10, should appear as shown below:

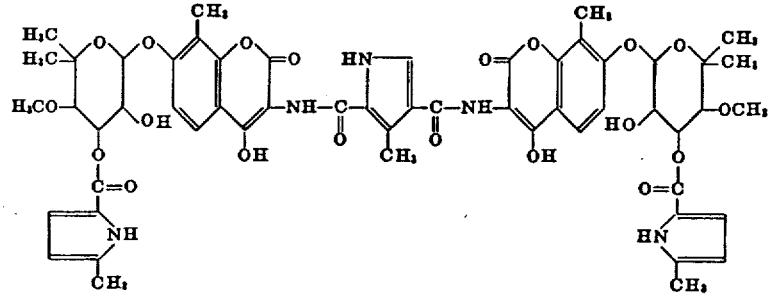

Signed and sealed this 14th day of October 1969.

[SEAL]
Attest:
EDWARD M. FLETCHER, JR.,
*Attesting Officer.*

WILLIAM E. SCHUYLER, JR.,
*Commissioner of Patents.*